(12) United States Patent
Argoitia et al.

(10) Patent No.: US 6,777,085 B1
(45) Date of Patent: Aug. 17, 2004

(54) ARTICLE AND METHOD OF PREPARING PIGMENTS USING MULTIPLE DEPOSITION SOURCES

(75) Inventors: Alberto Argoitia, Santa Rosa, CA (US); Roger W. Phillips, Santa Rosa, CA (US); Ludvik Martinu, Montreal (CA); Jolanta E. Klemberg-Sapieha, Pointe Claire (CA)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 107 days.

(21) Appl. No.: 10/126,243

(22) Filed: Apr. 19, 2002

(51) Int. Cl.⁷ .................................................. B32B 5/16
(52) U.S. Cl. .................... 428/403; 428/404; 428/426; 428/432; 428/433; 428/434; 428/448; 428/450; 428/469; 428/470; 428/471; 428/472; 428/328; 428/329; 428/33
(58) Field of Search ................... 428/403, 33, 404, 428/426, 432, 433, 434, 448, 450, 469, 470, 471, 472, 328, 329

(56) References Cited

U.S. PATENT DOCUMENTS

| | | | |
|---|---|---|---|
| 4,810,524 A | | 3/1989 | Nakayama et al. |
| 5,501,731 A | | 3/1996 | Schmid et al. |
| 6,241,858 B1 | | 6/2001 | Phillips et al. |
| 6,545,809 B1 | * | 4/2003 | Phillips ........................ 359/577 |
| 6,565,770 B1 | * | 5/2003 | Mayer et al. .......... 252/301.36 |
| 6,569,529 B1 | * | 5/2003 | Phillips et al. ............... 428/403 |
| 6,572,784 B1 | * | 6/2003 | Coombs et al. ........ 252/301.16 |
| 6,586,098 B1 | * | 7/2003 | Coulter et al. ............... 428/403 |

FOREIGN PATENT DOCUMENTS

| | | |
|---|---|---|
| JP | 10259316 | 9/1998 |
| JP | 10316883 | 12/1998 |

OTHER PUBLICATIONS

U.S. Patent application Ser. No. 09/685,468, Phillips et al., filed Oct. 10, 2000.
U.S. Patent application Ser. No. 09/844,261, Phillips et al., Apr. 27, 2001.
U.S. Patent application Ser. No. 09/850,421, Phillips et al., filed May 7, 2001.
S.A. Letts et al., *Ultrasmooth Plasma Polymerized Coatings for Laser Fusion Targets*, J. Vac. Sci. Tech., 19(3), 739–42 (Sep./Oct. 1981).
K. Sugai et al., *Aluminum Chemical Vapor Deposition with New Gas Phase Pretreatment using Tetrakisdimethylamino-titanium for Ultralarge-scale Integrated Circuit Metallization*, J. Vac.Sci.Tech., B 13(5) (Sep./Oct. 1995).
T. Ellison et al., *New High Speed, Low Cost, Roll-to-Roll Antireflectivity Coating Technology*, Proc. of the Soc. of Vac. Coaters, New Orleans, 14–17, (Apr. 1997).

(List continued on next page.)

*Primary Examiner*—Leszek B. Kiliman

(57) ABSTRACT

Particles are encapsulated with a layer or sequence of layers. The particles can be flakes and the layers can form an optical interference stack for use as an optically variable pigment, among other purposes. In a particular embodiment a highly reflective metal layer is deposited around a glass flake with specular surfaces. The particles can be produced using a variety of deposition systems. In a particular embodiment, a downstream plasma-enhanced chemical vapor deposition system achieves high deposition rates while avoiding contamination of the plasma source with deposition products.

37 Claims, 7 Drawing Sheets

OTHER PUBLICATIONS

L.A. Ketron, *Fiber Optics: The Ultimate Communications Media*, Ceramic Bulletin, vol. 66, No. 11 (1987).

L. Martinu et al., *Search for High Index PECVD Optical Coating Materials: The Case of Titanium Dioxide*, Soc. of Vac. Coaters, 43$^{rd}$ Annual Tech. Conf. Proceedings, Denver (Apr. 15–20, 2000).

J. Kang and S. Rhee, *Metalorganic Chemical Vapor Deposition of Nickel Films from $Ni(C_5H_5)_2/H_2$*, J. Mater. Res., vol. 15, No. 8, (Aug. 2000).

L. Mascia and Z. Zhang, *Metal Protection by Cold Sintered Silica Gel Coatings*, British Corrosion J., vol. 31, No. 1, 76 (1996).

H. Takashashi, *Temperature Stability of Thin–Film Narrow–Bandpass filters Produced by Ion–Assisted Deposition*, Applied Optics, vol. 34, No. 4 (Feb. 1, 1995).

* cited by examiner

ARTICLE AND METHOD OF PREPARING PIGMENTS USING MULTIPLE DEPOSITION SOURCES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable

BACKGROUND OF THE INVENTION

The present invention relates generally to coating particles with thin-film layers, and more particularly with coating particles used to produce optically variable "color shifting" pigments, i.e. Fabry-Perot or dielectric optical stacks.

Optically variable pigments ("OVP's"™) are used in a wide variety of applications. They can be used in paint or ink, or mixed with plastic. Such paint or ink is used for decorative purposes, as well as an anti-counterfeiting measure on currency. OVP's typically include a number of thin-film layers on a substrate that form an optical interference structure. Generally, a dielectric (spacer) layer is often formed on a reflector, and then a layer of optically absorbing material is formed on the spacer layer. Additional layers may be added for additional effects, such as adding additional spacer-absorber layer pairs. Alternatively optical stacks composed of (high-low-high)$^n$ or (low-high-low)$^n$ dielectric materials, or combinations of both, may be prepared.

Many different techniques are used to produce the OVP structure. One approach commonly referred to as "roll-to-roll" coating deposits the layers of materials on a moving plastic sheet (such as polyethylene terephthalate or "PET") that spools off of one roll and onto another. The total coated area is very large, and the thin-film stack has to be separated from the plastic roll to form the pigment. This is often done using an organic solvent, such as acetone, to dissolve a "hard coating" layer between the PET film and the thin-film stack. The separated pigment material is then ground and sorted for size for mixing into paints, inks, plastics, cosmetics, coatings, or other media.

However, acetone is undesirable because it is a volatile, flammable, organic compound that can contribute to air pollution and must be handled carefully to avoid affecting the work environment. The cost of the acetone adds to the manufacturing costs, and creates a waste stream for disposal of the acetone. It would also be desirable to avoid the cost of the roll of plastic sheet, which is typically disposed of and recycled, as well as the steps of removing, grinding, and sizing the pigment material.

Another approach is to deposit the color-shifting structure on small metal particles or flakes. In one process, the spacer and absorbing layers are deposited on aluminum flakes, which serve as the reflector in the pigment. The major surfaces of such metal flakes are generally not specular, which can cause dispersion of the light. Metal flakes can also be relatively heavy (dense).

Several techniques have been developed for depositing thin-film layers of various materials. Many deposition apparatus and techniques have been developed for manufacturing semiconductor devices, which often use much thinner films than are desired for manufacturing pigment. For example, the dielectric layer between the reflector and the absorber might be several hundred nanometers thick. Thus, other methods have been needed for forming the relatively thick dielectric layer around an aluminum flake. One process deposits a preliminary thin layer of silicon monoxide under vacuum on the aluminum flake to protect it during a sol-gel deposition step, which is a relatively fast wet chemical deposition process. The flakes are then dried and a thin-film layer of optically absorbing material, such as titanium nitride ("TiN"), is vacuum deposited on the flake. Techniques for depositing TiN layers are described in co-pending, co-assigned U.S. patent application Ser. No. 09/685,468 entitled TITANIUM-CONTAINING INTERFERENCE PIGMENTS AND FOILS WITH COLOR SHIFTING PROPERTIES by Phillips et al., filed Oct. 10, 2000, the disclosure of which is hereby incorporated by reference for all purposes.

While the resulting flakes have good optical variance properties, the manufacturing sequence is somewhat involved, particularly having to protect the aluminum flake from the wet processing step, and then having to dry the flakes before subsequent vacuum deposition steps. In addition, the process uses a roll of PET as the substrate, which is subsequently discarded. This approach becomes even more involved if several alternating layers of spacer and absorber materials are to be deposited. Therefore, the sol-gel approach encourages one to limit the optical structure to a single spacer layer.

It would be desirable to provide highly reflective flakes and optically variable pigment particles with high chroma, and to provide apparatus and methods for producing optical thin film stacks on particles that achieve high deposition rates with reduced contamination in the overall processing.

BRIEF SUMMARY OF THE INVENTION

One embodiment of the present invention provides an optically variable pigment particle with a substrate particle surrounded by a reflector layer that is surrounded by a spacer layer and an absorber layer. In another embodiment of the invention, a flake substrate with specular surfaces is surrounded by a highly reflective layer. In a particular embodiment, the flake substrate is a glass flake substrate. In further embodiments, the reflective layer is surrounded by additional layers of materials. In yet another embodiment of the present invention, an interference glass flake is surrounded by an absorber layer.

In another embodiment of the present invention, downstream plasma-enhanced chemical deposition systems with vibrating substrate holders are used to coat substrate particles. The vibrating substrate holder can be a vibrating tray that moves the particles past the deposition zone. In a particular embodiment, the particles are circulated past a downstream plasma source or sources. In other embodiments the particles make a single pass. In alternative embodiments particles fall past a downstream plasma source or sources, and may be circulated or make a single pass. In further embodiments, several plasma sources are provided. The various plasma sources can all deposit the same material, can deposit different materials, or some can deposit material(s), while others perform plasma processes such as cleaning, surface activation, or densification of the particle or deposited layer(s).

DETAILED DESCRIPTION OF THE INVENTION

The present invention provides thin-film coated flakes for a variety of applications. In some embodiments, a dielectric flake or other particle is coated with a reflective layer that surrounds the particle, which is then coated with additional thin-film layers. In an alternative embodiment, a dielectric sheet is coated with a reflective layer and then ground into a reflective preflake. In another embodiment, a glass flake or sheet that has a light interference thickness (on the order of visible wavelengths) is coated with an absorber layer to form a pigment particle. In yet another embodiment, a metal preflake is coated with a reflective layer, and then with additional thin-film layers. The metal preflake could be a magnetic metal, for example. Alternatively, a dielectric substrate flake could be encapsulated with a magnetic material acting as a reflector. Typically, each successive layer surrounds the prior layer. In some embodiments, the flakes are used in optically variable pigments and the thin film layers form optical interference structure.

I. Exemplary Flake Structures

Figure 1A:
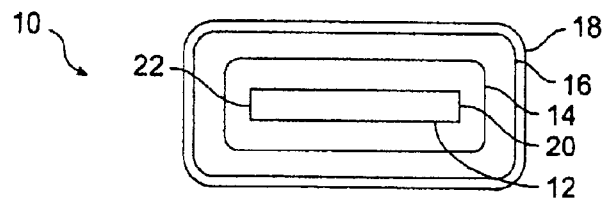
FIGS. 1A–1J are simplified cross sections of coated flakes according to some embodiments of the present invention.

FIG. 1A is a simplified cross section of a coated flake 10 according to an embodiment of the present invention. The coated flake includes a flake substrate 12 that is encased by a layer of reflective material 14. A spacer layer 16 is formed around the reflective layer 14, and an absorber layer 18 is formed around the spacer layer 16. An absorber layer is generally a gray metal where n and k are approximately equal (n being the real part and k the imaginary part of the refractive index), or may be an absorbing dielectric material, such as $Fe_2O_3$ or may be a semiconductor, such as TiN, TiC, TiON, TiCN or TiOCN, or even may be graphitic carbon. While a thin layer of chromium metal may be used as an absorber layer, chromium may present undesirable waste stream issues, which using TiN as an absorber layer avoids.

The spacer layer is often made of a dielectric material and is commonly referred to as a "dielectric" layer even if the material is not dielectric, such as a high band-gap semiconductor. The reflector, spacer, and absorber layers can form an optical interference structure, for example.

The flake substrate can be a variety of materials, including glass, mica, alumina, iron oxide, graphite, bismuth oxychloride, boron nitride, polymer or metal, and can range from opaque to water-white (clear). In a particular embodiment it is a glass flake about 0.1 micron to 1 micron thick and about 20 microns across. This allows the flakes draw down and lie flat upon one another and not lay at an angle. For purposes of discussion, the width of the flake is the greatest distance across the face of the flake.

In some applications it is desirable that the glass flake substrate is at an interference thickness, which is between about 0.07–1.2 microns, preferably about 0.2–0.7 microns, and about 0.6 microns in a particular embodiment. A flake that has an interference thickness can form an OVP by coating a semi-transparent absorbing layer onto the interference thick transparent flat substrate. A 3-layer (absorber-interference glass-absorber) OVP particle can be made using this technique, which reduces the number of deposition steps compared to a reflector-spacer-absorber type OVP particle. It is generally desirable that the total thickness of the 3-layer OVP particle be less than 800 nm for good color and to facilitate the particles lying flat when applied to a surface.

Other substrates can be used in other instances, and do not have to be in the form of a flake. Platelets, spheres, obloids, cubes, whiskers, and cylinders are a few examples of other shapes the substrate could be surrounded with thin film layers. Particle sizes generally range from less than a micron to about a millimeter, and can be magnetic. In a particular embodiment, silica spheres about 5 microns in diameter are coated with a reflective layer. A large flake or platelet could be coated with an optical interference stack and ground to result in smaller flakes, or a large flake could be coated with a reflector layer and ground to a smaller size before coating with the spacer and absorber layers. However, if the desired particle size were used in the initial coating of the reflector, no subsequent grinding step would be needed because the lateral size of the coated flake would be the desired size. The coatings typically add only a small increase in the lateral size of the flake.

If the coated flake is to be used in an OVP application, it is desirable that the flake have at least an aspect ratio of 2:1 (width to thickness) and in a particular embodiment have an aspect ratio of about 20:1, representing a flake that is about 20 microns across and about 1 micron thick. It is desirable that pigment flakes have an aspect ratio of at least 4:1, and aspect ratios up to 1000:1 are envisioned. Particles are generally in the range of 5–200 microns, more preferable in the 10–50 micron range, and even more preferably in the 10–30 micron range. An aspect ratio of at least 4:1 is desirable with pigment flakes so that the flakes lie flat on not end up on their edges when applied to a surface.

Note that the substrate flake 12 is coated on its edges 20, 22. Such coating enhances the chroma of the resultant flake when used as an OVP flake because the edge of the flake is still optically variable. Chroma is the degree of perceived color of an object compared to a gray object having the same brightness and a reflective edge can reduce the color of coatings made with the flakes. While a variety of substrate materials can be used, flakes having a specular major surface are desirable to produce highly reflective surfaces that in turn produce high-quality pigments. Other processes start with an aluminum flake that does not have a specular surface, which can scatter the reflected light. A specular dielectric flake is also desirable because it is generally stiffer than a comparable aluminum flake, thus maintaining its flatness, particularly after coating with thin film layers that can introduce stresses that cause the flake to twist or curl, and can be lighter than a solid aluminum flake.

In some embodiments glass flakes are used. The glass flakes can be made using various techniques, such as by spinning into sheets or blowing molten glass into bubbles that are then ground into flakes. Glass flakes prepared by using molten glass processes can be made essentially without microcracks. Alternatively, $SiO_2$-based glass flakes or $MgF_2$ flakes can be made using roll coating techniques; however, flakes made by roll coating processes may have stress-induced microcracks that may cause the particles to break into smaller particles during an application.

The reflective layer 14 is generally an opaque layer of a reflective metal, such as aluminum, copper, platinum, silver, or gold, or other material, such as TiN or ZrN, among others. Aluminum is often selected because it has high reflectivity across the visible spectrum and is relatively inexpensive. The material chosen for the reflective layer should be compatible with the subsequent layer(s), and possibly with the end use if the subsequent layers do not protect the metal layer from the environment. A typical reflector layer of aluminum might be about 50–80 nm thick on a glass flake substrate.

The spacer layer 16 can be made from a variety of materials including SiO, $SiO_2$, $TiO_2$, $ZrO_2$, $Al_2O_3$, $MgF_2$, ZnS, and $Si_3N_4$, to name a few. These materials may have various stoichiometric ratios, such as $SiO_X$, where 1<X<2. Multi-layer dielectrics may also serve as the dielectric layer, for example, a dielectric layer may include a first layer of $SiO_2$ and a second layer of $TiO_2$, or may be a layer of $SiO_X$ mixed with $TiO_X$ or $ZrO_X$. Similarly, the stoichiometry of a single material may vary within the dielectric layer, such as from SiO to $SiO_2$, and the ratio of phases within a mixed-phase layer can be graded or varied. Such mixtures can be used to adjust the refractive index of the layer to select optical properties, such as color travel or color flop, of the resulting pigment. In particular, mixtures of high- and low-index materials (such as $TiO_2$–$SiO_2$) can make graded or inhomogeneous dielectric layers that will change the color traveling properties of an OVP.

The spacer layer 16 ranges from about 2 quarter wave optical thicknesses ("QWOT's") at 400 nm to about 8 QWOT's at 700 nm. The thickness is selected according to the desired optical properties, i.e. interference wavelength, and the material(s) used for the spacer layer.

The absorber layer 18 can be another layer of dielectric material, such as a semi-transmitting layer of TiN or ZrN, or a non-opaque layer of metal. Non-opaque layers of metal are thin enough to pass some of the incident light through to the spacer and reflector, while absorbing some of the light, and reflecting the remainder. Other materials, such as carbonitrides, are suitable for the absorber layer. The absorber layer can be made from a selectively absorbing material, which absorbs more in one part of the visible spectrum than another, or may be non-selective, i.e. essentially uniformly absorbing over the visible spectrum.

In one embodiment, the coated flake includes a dielectric flake substrate with specular major surfaces, an aluminum reflective layer, an aluminum oxide spacer layer, and an aluminum sub-oxide ($Al_2O_{<3}$) absorber layer or a layer of semi-transmitting aluminum. This structure is desirable because a single metal source can be used in a deposition system to produce the three desired layers for the reflector, spacer, and absorber. The aluminum reflector layer can be opaque or semi-transparent with the thickness of the dielectric flake substrate between about 0.1–2.0 microns. The aluminum sub-oxide is a substiochiometric material that may be made by depositing the aluminum in an oxygen atmosphere too low in oxygen for full oxidation, or in the presence of water vapor. The spacer layer may be made by depositing aluminum as a metal followed by reactive oxidation using oxygen plasma. The flake substrate provides stiffening to prevent curling of the resultant flake. Curl reduces chroma (color saturation) and therefore flatness is desired for an optical pigment flake. In another embodiment of the present invention, a highly reflective flake is produced by coating at least one surface of a specular dielectric flake with a reflective layer, and in a particular embodiment, the dielectric flake is surrounded by the reflective layer.

Figure 1B:
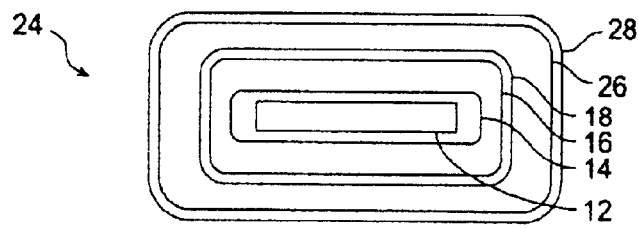

FIG. 1B is a simplified cross section of a coated flake 24 according to another embodiment of the present invention. The coated flake has a flake substrate 12 encapsulated by a reflector layer 14, a dielectric layer 16, and a first absorber layer 18. A second dielectric layer 26 and second absorber layer 28 encapsulate the first absorber layer 18. The first and second absorber layers can be made of the same or different materials. Similarly, the first and second dielectric layers can be made of the same or different materials.

Figure 1C:
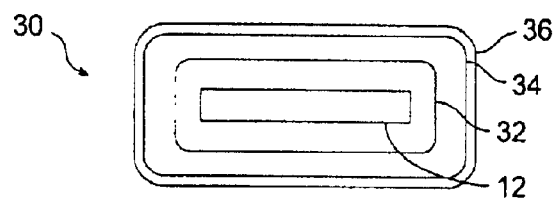

FIG. 1C is a simplified cross section of a coated flake 30 according to another embodiment of the present invention. The flake substrate 12 is encapsulated by a first absorber layer 32, which is encapsulated by a spacer layer 34, and a second absorber layer 36.

Figure 1D:
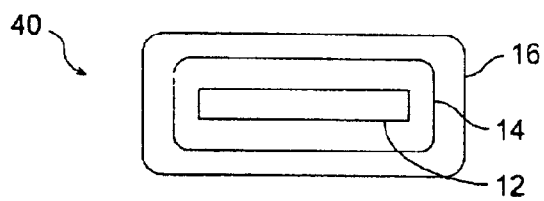

FIG. 1D is a simplified cross section of a coated flake 40 according to another embodiment of the present invention. A reflective layer 14 surrounds the flake substrate 12. The reflective layer is surrounded by an optional protective layer 16 that is transparent in the visible portion of the spectrum. In a particular embodiment the flake substrate is a dielectric flake substrate with a specular surface. In an alternative embodiment, a reflective layer does not surround the specular dielectric flake substrate. In a further embodiment, the reflective layer is only on one side of the specular dielectric preflake.

Figure 1E:
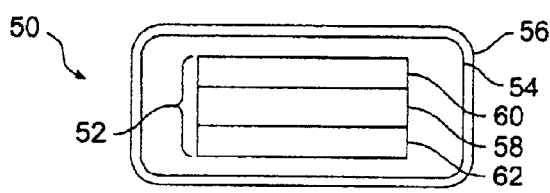

FIG. 1E is a simplified cross section of a coated flake 50 made according to embodiments of the present invention. A pre-flake 52 is encapsulated by a dielectric layer 54 and an absorber layer 56. The pre-flake 52 is a reflective flake 58 coated with $SiO_X$ 60, 62 on both sides. The pre-flake is typically made in relatively large sheets, then processed to obtain the desired sized flakes, which are commonly called "bright aluminum" flakes because the $SiO_X$ coatings protect the aluminum against corrosion. The reflective flake 58, can be aluminum, for example.

Figure 1F:
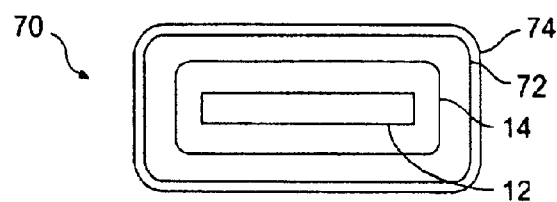

FIG. 1F is a simplified cross section of a coated photoluminescent flake 70 according to another embodiment of the present invention. The flake substrate 12 is encapsulated by a reflector layer 14, a photoluminescent layer 72, and an absorber layer 74. The photoluminescent layer could be fluorescent or phosphorescent, for example, and be a layer of homogenous photoluminescent material, or particles of photoluminescent material dispersed in a matrix.

Figure 1G:
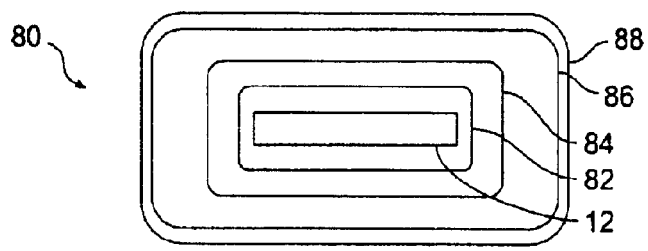

FIG. 1G is a simplified cross section of a coated magnetic flake 80 according to another embodiment of the present invention. The flake substrate 12 is encapsulated with a magnetic layer 82, which is encapsulated with a reflector layer 84. A spacer layer 86 encapsulates the reflector layer 84, and an absorber layer 88 encapsulates the spacer layer. The magnetic layer can be formed from a soft or hard magnetizable material, such as CoNi (in an atomic ratio of 80:20), iron, iron oxide ($Fe_3O_4$), or nickel. In an alternative embodiment, the flake substrate is coated on one or both major surfaces with a ferromagnetic material to provide a preflake that is subsequently encapsulated by the reflective layer and other layers.

Figure 1H:
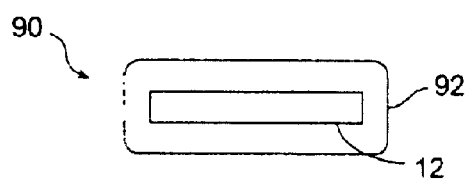

FIG. 1H is a simplified cross section of a coated flake 90 according to another embodiment of the present invention. The flake substrate 12 is encapsulated with an absorber layer 92 that is semi-transmitting and semi-reflecting. The absorber layer can be made of an optically dense metal, metal alloys, or alloys with at least some non-metal constituents. The substrate can be interference glass. That is, the thickness of the glass flake is an interference thickness, generally between about 0.07 to 1.2 microns, preferably 0.2 to 0.7 microns, and the glass is clear.

Figure 1I:
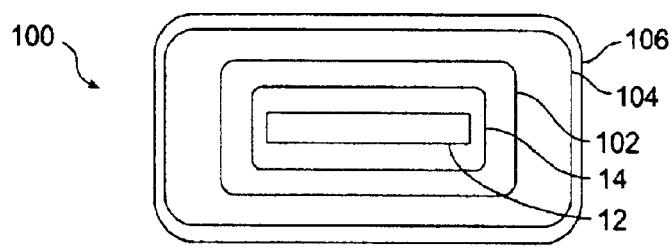

FIG. 1I is a simplified cross section of a coated flake 100 according to another embodiment of the present invention. The flake substrate 12 is encapsulated by a reflector layer 14, which is encapsulated by a selective absorber layer 102. A selective absorber material absorbs more in one part of the visible spectrum than another. In a particular embodiment the selective absorber material is $Fe_2O_3$, which selectively absorbs in the red part of the visible part of the electromagnetic spectrum. The selective absorber layer 102 is encapsulated by a spacer layer 104, which is encapsulated by a second absorber layer 106.

Figure 1J:
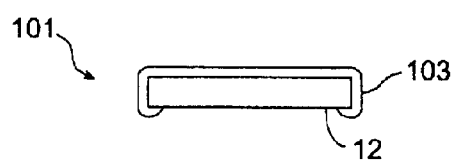

FIG. 1J is a simplified cross section of a coated flake 101 according to another embodiment of the present invention. The flake substrate 12 is coated on at least one side and the edges with a reflector layer 103. In a particular embodiment, the flake substrate is clear, and is reflective viewed from either major surface, or the edge(s). In another embodiment, a portion of one or both major surfaces is uncoated. The flake appears reflective from either direction with a clear substrate. Partial coating may occur incidentally if the flake substrates are not mixed to expose all surfaces to deposition source, or if one flake is partially masking another, for example.

II. Exemplary Apparatus

Figure 2A:
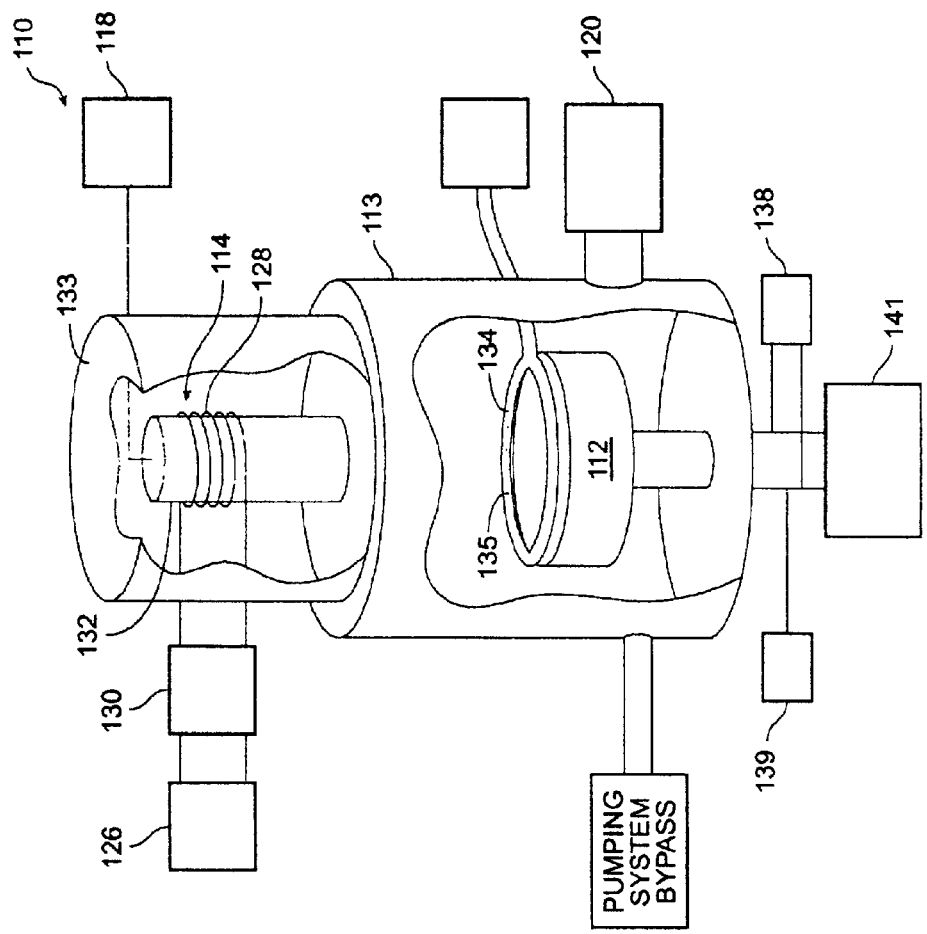
FIG. 2A is a simplified perspective view of a deposition system according to an embodiment of the present invention.

FIG. 2A is a simplified perspective view of a deposition system 110 according to an embodiment of the present invention (shown in partial cutaway). The particles or other substrates are supported by a substrate holder 112 in a deposition chamber 113. The substrates could be fixed on the holder, or may move across the holder, such as substrates in a vibrating tray or on a moving sheet. A plasma generator 114 generates a high-density plasma in a plasma generation zone from a process gas or vapor 118, which is drawn through the plasma generation zone toward a vacuum pump system 120. This causes a flow of excited species into a deposition zone where material(s) is deposited on the substrate or particles.

A radio-frequency (RF) power supply 126 drives coupling coils 128 through a matching network 130. The coupling coils create an electromagnetic field in the plasma generation zone through a dielectric tube 132, which converts the precursor gas into excited species, such as ions and free radicals. An RF shield 133 (shown in partial cutaway) suppresses electromagnetic noise produced by the coupling coils.

Deposition precursor gas(es) are provided to the chamber through a gas ring distributor 134 that has a number of gas ports 135. The excited species arriving in the deposition zone from the plasma generation zone assist in the deposition of the desired material on the substrates. Locating the gas ring distributor between the plasma generation zone and the substrate avoids decomposing the deposition precursor gases in the dielectric tube132. A DC, AC, or RF bias supply 138 can be connected between the chamber 113 and the substrate holder 112 to assist in the transport and excitation of deposition species to or from the substrate. A heater 139 may be added to heat the substrate or particles. The heater may be an electric resistance heater or an RF heater. A motor drive 141 may be added to raise and lower the substrate holder.

Figure 2B:
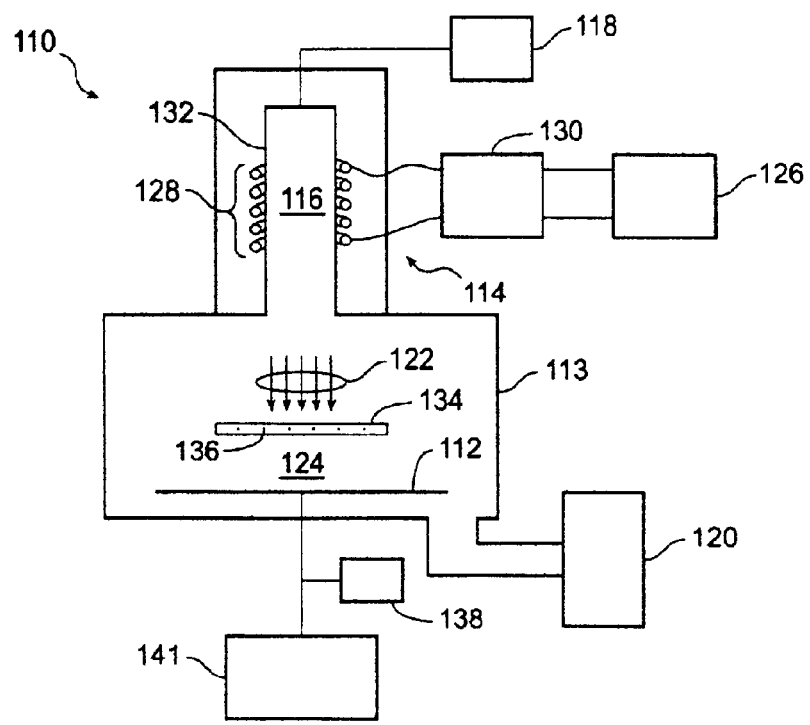
FIG. 2B is a simplified side view diagram of the deposition system illustrated in FIG. 2A.

FIG. 2B is a simplified side-view diagram of the deposition system 110 illustrated in FIG. 2A. The particles or other substrates are supported by the substrate holder 112 in the deposition chamber 113. The substrates could be fixed on the holder, or may move across the holder, such as substrates in a vibrating tray or on a moving sheet. A plasma generator 114 generates a high-density plasma 116 in a plasma generation zone from a process gas or vapor(s) 118, which is drawn through the plasma generation zone toward a vacuum pump system 120. This causes a flow of excited species (represented by arrows) 122 into a deposition zone 124.

Deposition precursor gas(es) are provided to the chamber through a gas ring distributor 134 that has a number of gas ports 136. The excited species arriving in the deposition zone from the plasma generation zone assist in the deposition of the desired material on the substrates. A DC, AC, or RF bias supply 138 can be connected between the chamber 113 and the substrate holder 112 to assist in the transport of deposition species to or from the substrate.

Figure 2C:
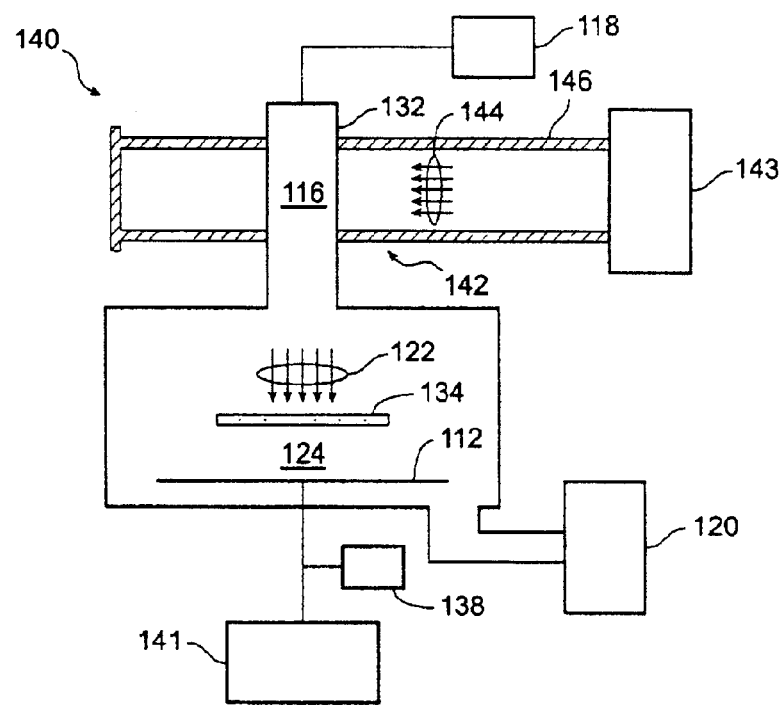
FIG. 2C is a simplified side view diagram of a deposition systems according to another embodiment of the present invention.

FIG. 2C is a simplified diagram of a deposition system 140 according to another embodiment of the present invention. The plasma generator 142 includes a microwave ("MW") generator 143 that produces MW energy (represented by arrows) 144 conveyed to the plasma generation zone 116 through a waveguide or microwave applicator 146 and the dielectric tube 132. The excited species 122 flow toward the deposition zone 124 to facilitate the formation of desired layers of deposition material(s) on the substrate(s). Many other types of plasma generators are suitable for deposition systems according to embodiments of the present invention, including direct-coupled MW generators, transformer-coupled generators, and capacitively coupled generators, to name a few of the many types of suitable plasma generators. Other types of applicators are also suitable, such as RF flat coil(s) and Ladder-type applicators.

Various conventional methods use a fluidized bed chemical-vapor deposition ("CVD") technique. The fluidized bed typically uses a gas to elevate the particles. Such a fluidization technique might be used in some embodiments of the present invention, but mechanical vibration is preferred because it does not introduce fluidization gas into the reaction chamber, which increases the pumping requirements. Also, the fluidization gas should be compatible with the deposition process. Using vibration to elevate, mix, move, and homogenize the particles avoids the problem of a fluidizing gas affecting the deposition process.

A vibrating bed may be used that does not move the particles, but homogenizes them so that the thin films are deposited on all surfaces (encapsulate) the particles. A deposition system might be configured in an in-line fashion, with particles entering the system at one end. A layer or layers of thin film material(s) is deposited on the particles, and the particles are removed at another end. Vacuum load locks can be used to introduce particles into and remove coated particles from the deposition system in an essentially continuous fashion without breaking the main vacuum on the deposition system.

Similarly, many processes use a thermal CVD technique. Thermal CVD relies on thermal energy to activate a deposition reaction. This typically means that the deposition temperature is relatively high. In plasma-enhanced CVD ("PECVD"), the deposition reaction is facilitated by activated species from the plasma source and the deposition temperature is typically lower. For example, the temperature deposition of silicon nitride from silane or halide silane gases and ammonia or nitrogen drops from about 900° C. to near room temperature when a plasma is applied to facilitate the chemical reactions in the gas phase. Plasma sources can also reduce the size (footprint) of a deposition system, compared to a physical vapor deposition ("PVD"or "sputtering") system because a plasma source can be used to deposit different materials by providing different precursors. CVD can also be essentially a 3-dimentional process, whereas the material in a PVD system essentially comes from a point source or plane in a line-of-sight fashion, in an essentially 2-dimensional deposition.

Downstream PECVD is preferable to direct PECVD, although the latter can be used to produce embodiments of the present invention. In direct PECVD, precursors are converted to plasma, and the substrate and walls of the reactor used to couple the electrical field become covered with a layer of the material. In particular, the deposition of electrically conducting materials for long periods of time can degrade the operation of the plasma generator by coating dielectric generator components with the conductive material.

In downstream PECVD the process gas used to form the plasma in the plasma source can be separated from the precursor gas. The process gases are introduced directly in the high-intensity plasma region and the precursors or reactant gases are introduced downstream in the plasma. This avoids the deposition of material on the dielectric walls of the plasma applicator and contamination of the plasma applicator from particles that might be attracted to the electromagnetic fields present in a direct plasma system. The distinction between process gases and precursors depends on where the gases are brought into the deposition system. For example, nitrogen might be a component of the process gas that combines with a metal-containing precursor to form a metal nitride layer. Thus, elements of the process gas might be incorporated into the deposited material. However, nitrogen, in this example, would not create significant contamination of the plasma source. Argon or other inert gas(es), such as He, Ne, and Xe, can be introduced to change the energetics of the plasma.

It is generally desirable that the plasma source be capable of generating a high-density plasma, which would have an ion density greater than $10^{11}$ cm$^{-3}$. Typically, inductive coupling of RF power (0.5 to 100 MHz) can produce ion densities in excess of $10^{12}$ cm$^{-3}$. In the case of a downstream plasma system, the inductive circuit element is adjacent (outside a dielectric wall) to the discharge region in order to couple energy from the RF power source to the process gas. Depending on the configuration, these plasma sources can be divided typically as helical couplers, helical resonators, spiral couplers, and transformer-coupled plasmas.

High-density plasmas can also be obtained using microwave plasma sources. Typically, for microwave plasma generation, rectangular waveguides guide the microwaves from a microwave generator to an applicator (see FIG. 2C). The high-intensity plasma generated from the process gases inside the dielectric chamber is sufficient for the effective activation of the reactive gases downstream. Alternatively, a microwave source could couple microwaves into the plasma generation zone through a dielectric window.

Figure 3A:
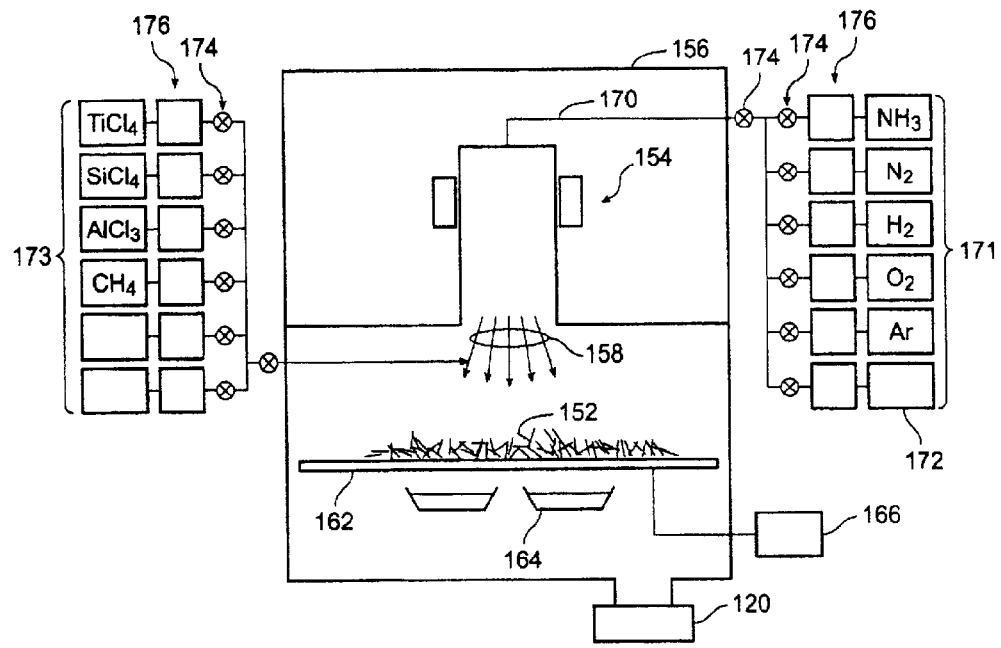
FIG. 3A is a simplified side view of a portion of a flake coating system according to an embodiment of the present invention.

FIG. 3A is a simplified diagram of a deposition system 150 for forming encapsulating layers on substrate particles 152 according to an embodiment of the present invention. The plasma generator 154 is located inside the reactor wall 156 (i.e. the vacuum chamber), but could be located outside of the reactor wall in other embodiments. Plasma generated in the plasma generator is transported downstream (represented by arrows 158) toward the vacuum system 120 (chamber exhaust). The substrate particles, which are illustrated as flakes but could be any of several shapes, including several different shapes during a coating run are supported and moved along a vibrating tray 162. In some embodiments, particles of different shapes are used to facilitate fluidization, such as by adding spheres to flakes.

The vibrating tray imparts motion to the particles (into or out of the page in this view), as well as homogenizing the particles so that all surfaces of all the particles are essentially evenly coated. The vibrating tray, and hence the particles, can be heated by heaters 164, such as heat lamps or resistive heaters. A DC or RF bias may be optionally applied between the vibrating tray and the reactor by a bias supply 166.

Process gases 170 are provided to the plasma generator 154 from sources 171and may include several gases, such as NH$_3$, N$_2$, H$_2$, O$_2$, Ar, or other gases 172. Gas flows are controlled by valves 174 and flow controllers 176, such as mass- or volume-flow controllers, as are known in the art. Precursor gases or vapors 173 are provided to the reaction chamber through other valves 174 and flow controllers 176. Examples of precursor gases include ZrCl$_4$, TiCl$_4$, SiCl$_4$, AlCl$_3$, CH$_4$, other metal halides (Cl, Br, I, F), hexamethyldisiloxane ("HMDSO") ((CH$_3$)$_3$SiOSi(CH$_3$)$_3$), hexamethyldisilazane ("HMDSN") ((CH$_3$)$_3$SiNHSi(CH$_3$)$_3$), hexamethyldisilane ("HMDS") ((CH$_3$)$_3$SiSi(CH$_3$)$_3$), tetraethylorthosilicate ("TEOS") (Si(OC$_2$H$_5$)$_4$), tetramethyl orthosilicate ("TMOS") (Si(OCH$_3$)$_4$), tri-butyl aluminum ("TBA"), organometallics, and various dopant sources. The precursor gases combine with each other and/or excited species from the plasma generator to form layers on the particles. Other types of precursor or process gases or vapors are used depending on the desired thin film layers to be formed on the particles.

For example, the precursor gases described above could be used in conjunction with the process gases or gas to form an aluminum layer encapsulating the particles, then a silicon oxide layer, then a titanium or titanium nitride layer. For some thin film stacks, the spacer layer is relatively thick. A plasma-assisted deposition process can achieve deposition rates to produce the desired thickness in an acceptable period of time.

Figure 3B:
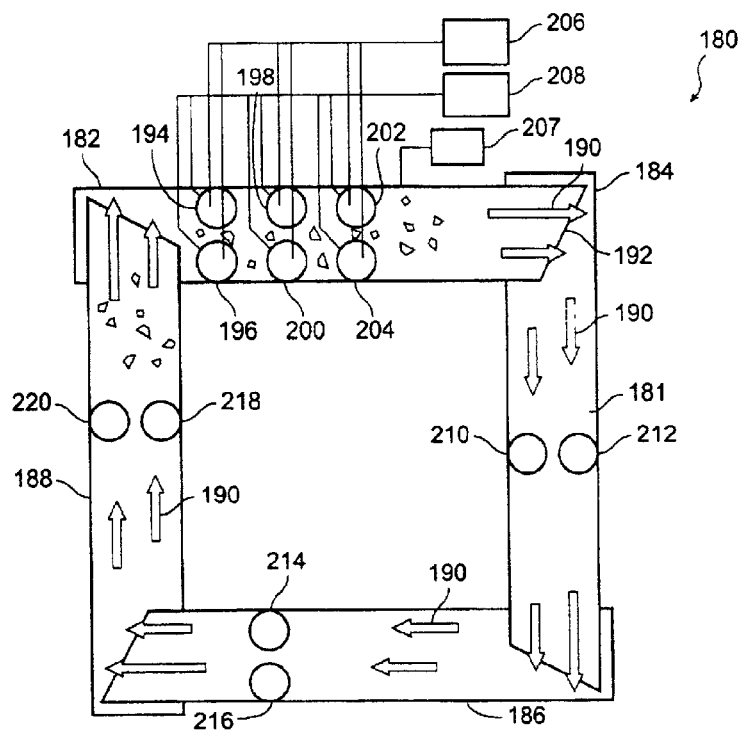
FIG. 3B is a simplified top view of the flake coating system illustrated in FIG. 3A.

FIG. 3B is a top view of a diagram of a deposition system 180 according to an embodiment of the present invention. Vibrating trays 182, 184, 186, 188 are arranged in a square and each vibrates to move particles in the trays in the direction of the arrows 190. The trays could be arranged in a rectangle, or more or fewer trays could be arranged in other configurations, such as a triangle, pentagon, hexagon, etc. The trays are sloped and the vibratory motion lifts the particles up the slope as well as moves them along the trays. The ends 192 of the trays overlap the underlying tray 184 so that the particles fall off the end of one tray 182 onto another 184. The ends of the trays are angled to provide an essentially uniform distribution of particles to the underlying trays. In an alternative embodiment the particles are not recirculated around a "racetrack" of trays, but are processed in a single pass under the deposition stations. An additional embodiment uses a vibrating bowl to constantly mix the particles.

Plasma sources 194, 196, 198, 200, 202, 204 receive process gas(es) from a process gas manifold 206. Only one gas line is shown for purposes of illustration, but each plasma source might have a separately controlled and multiplexed line from the manifold. Each plasma source might receive the same process gas, such as oxygen, or each might receive a different process gas. Details of individual gas lines, valves, and flow controllers are omitted for simplicity of illustration. The plasma sources are arranged as pairs transverse to the motion of the particles, and may be scaled to accommodate wider or narrower trays. In other embodiments a single plasma source might be used across the tray, such as an oval or rectangular plasma source. It is not necessary that all plasma sources be of the same type or configuration. A bias supply 207, such as an RF supply operating at 13.56 MHz, may be added to assist the deposition process(es).

Precursor gases are provided to the deposition zones of the respective plasma generators from a precursor gas manifold 208. Some precursor gases or vapors spontaneously decompose to form thin film layers on the particles, especially if the particles are heated, for example. Other precursors decompose when combined or react with excited species or other species of the process gas(es). Additional plasma sources 210, 212, 214, 216, 218, 220 may optionally be added to the system. These plasma sources can be used for additional deposition processes, or for other purposes, such as a plasma cleaning or surface activation step. Gases could also be mixed to deposit alloys of metals or oxides.

In other embodiments, one or more of the plasma sources are replaced with other sources. For example, a Knudsen source configured to coat in a downward direction could be used, as could sputtered aluminum or other metals using DC magnetron sources.

Knudsen sources are basically a hot source of material surrounded by a hotter shroud or "hat" with a hole(s), slit(s), or similar aperture that allows the material to flow out of the source and be deposited on the substrate. Material deposition on the shroud is avoided because it is hotter than the material source. A Knudsen source may have a fixed charge, or be configured to operate with a replenishing charge.

Knudsen sources could deposit semiconductors, such as indium-tin oxide, or employ a sublimable dielectric material, such as SiO, $MgF_2$, or ZnS. Additional oxygen gas could be added in the SiO deposition to form SiOx wherein 1<x<2. Similarly, a Knudsen source or sputtering source could be used in the presence of precursor gas(es), such as $N_2$, $CH_4$, acetylene, or propane, and combinations of gases, to form nitride, carbide, or carbo-nitride layers for an absorber in an optical stack or other type of layer. In a particular embodiment, a Knudsen source deposits a reflective layer of aluminum on a flake substrate, a plasma-enhanced deposition source is used to deposit the spacer layer, such as PECVD $SiO_2$, and an arc-magnetron source is used to deposit the absorber layer. The arc magnetron could be used to sputter titanium in the presence of nitrogen, for example, to form TiN.

Figure 4A:
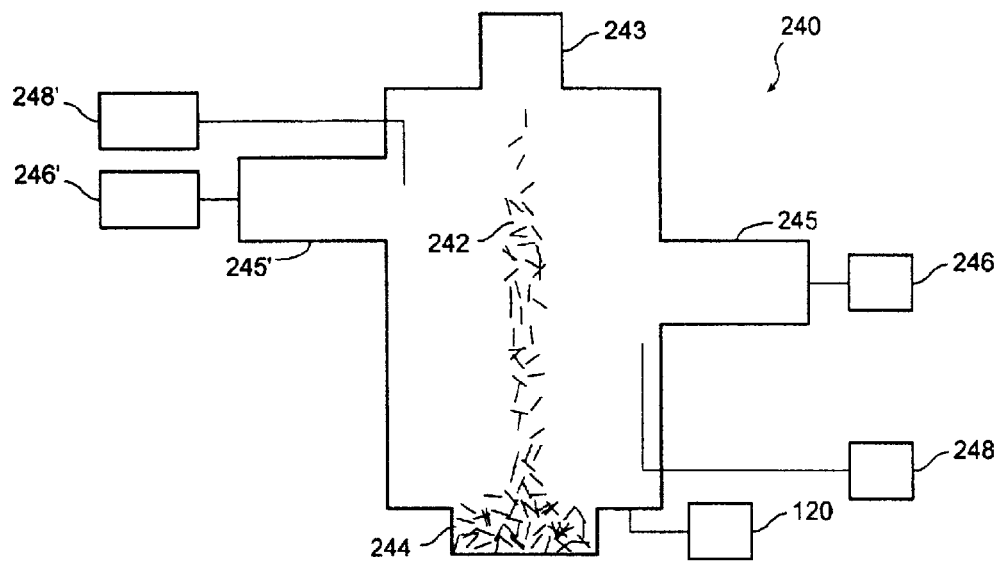
FIG. 4A is a simplified side view of a portion of a flake coating system for coating free-falling flakes according to another embodiment of the present invention.

FIG. 4A is a simplified diagram of a side view of a portion of a deposition system 240 according to another embodiment of the present invention. A "curtain" of free falling particles 242, such as flake substrates, falling from a flake source 243 to a particle accumulator 244 passes by a downstream plasma source 245. Process gas(es) 246 is delivered to the plasma source and formed into plasma. Precursor gas(es) 248 is delivered between the plasma generation zone and the particles. The products from the plasma generation zone flow "downstream", which in this instance is sideways, toward the vacuum system 120 to facilitate deposition of a layer or layers of thin-film material on the particles. The particles may fall a single time, or may be recirculated through the deposition system to build up a layer of material on the particles, or to form sequential layers of materials on the particles.

A plasma source 245' may be added to the other side of the curtain to increase the downstream plasma flux toward the particles. The second plasma source 245' is generally provided with the same process gas(es) 246' and the same precursor gas(es) 248' so that the same material forms on the particles, but may be provided with different process and/or precursor gases to form different materials in a single pass, such as for forming a mixed-phase layer, or one source may perform a plasma densification, plasma clean step, or other plasma step, while the other performs a downstream plasma deposition or other plasma step.

Figure 4B:
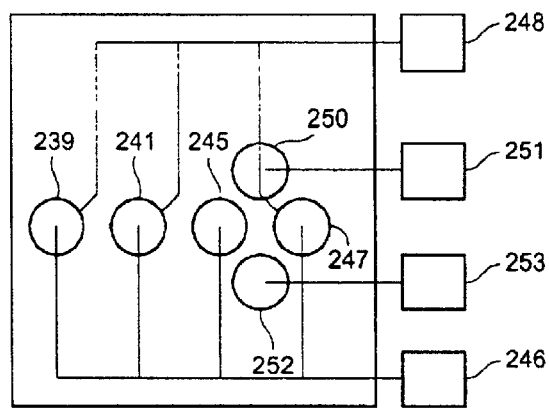
FIG. 4B is a simplified plan view of a portion of the flake coating system illustrated in FIG. 4A.

FIG. 4B is a simplified diagram of a side view of the portion of the deposition system 240 illustrated in FIG. 4A, ninety degrees from the side view of FIG. 4A. Four plasma sources 239, 241, 245, 247 are shown in a row, but more or fewer may be used to scale the deposition system according to the size of the curtain of particles 242 and plasma sources. In one embodiment four additional sources are on the opposite side of the particle curtain, but are not visible in this view (see FIG. 4A, ref. num. 245'). The process gas source 246 and precursor gas source 248 provide gases to each of the four plasma sources, but different gases are provided to different plasma sources in other embodiments, i.e. it is not necessary that all plasma sources receive the same gases or product the same reaction product Similarly, additional plasma sources 250, 252 can be stacked above or below the other plasma sources 239, 241, 245, 247. These optional sources can be downstream plasma deposition sources, or can provide other plasma processing steps, and receive process gases from other process gas sources 251, 253. For example, the upper plasma source(s) 250 can plasma clean or activate the particles, the middle plasma sources 244 can deposit a thin film layer of material on the particles, and the lower plasma source 252 can densify or passivate the thin film layer.

III. Exemplary Processes

Figure 5:
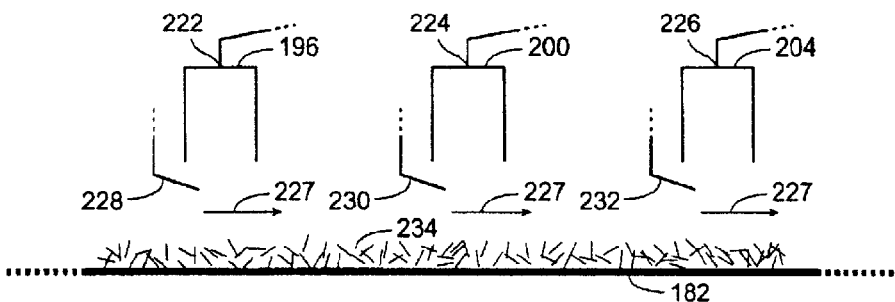
FIG. 5 is a simplified side view of a portion of a flake coating system according to another embodiment of the present invention.

FIG. 5 is a highly simplified representation of a portion of the deposition system illustrated in FIG. 3B that will be used to illustrate how the system can be used to deposit various types of materials for optical thin-film stacks or other thin-film structures, such as stacks of magnetic material(s). Plasma sources 196, 200, 204 receive process gas(es) at their respective inlet ports 222, 224, 226 and form plasma that travels downstream to react with or facilitate the decomposition of precursor gases that are provided to the respective reaction (deposition) zones through precursor inlets 228, 230, 232.

Flakes 234 or other particles are moved along the vibrating tray 182 underneath the various plasma sources and reaction zones in the direction of the arrows 227, and thin film layers of various materials are deposited on the flakes. The vibrating trays not only move the flakes along, but also agitate the flakes so that deposition can occur on all surfaces of the flakes, and a homogeneous thin film layer can encapsulate the flake. The speed of the flakes is essentially constant as it moves under the different reaction zones, and may be adjusted in light of the deposition rates of the various materials. One deposition rate may dominate, for example the deposition rate of the thickest layer, the slowest deposition rate, or the most critical thickness of material in a thin film stack, which determines the speed of the particles, which may be adjusted within the limits of the vibrating tray system. Other deposition rates may be adjusted by controlling the amount of precursor gas to the reaction zone or process gas to the plasma source.

The deposition system may be used to deposit a layer of metal, alloy, or a series of metal layers on a moving flake or particle. In one embodiment, $Ni(C_5H_5)_2$ is provided to the first precursor inlet port 228 (which in practice may be a ring of inlet ports), $AlCl_3$ is provided to the third precursor inlet port 230, and $SiCl_4$ is provided to the third precursor port 232, along with oxygen, but this configuration of precursor gases is merely exemplary, and in some embodiments any of the precursor gases or vapors may be routed to any of several reaction zones from their respective sources through the gas manifold, or a source or sources may be connected to any of several reaction zones with fixed plumbing. A mixture of $H_2$ and Ar may be provided as process gases to each of the plasma sources for these precursors. This configuration can produce a bright magnetic flake having a layer of nickel encapsulating the substrate, a layer of aluminum encapsulating the nickel layer and substrate, and a layer of silicon dioxide encapsulating the aluminum layer and protecting it from corrosion.

Many different thin film structures may be produced. For example, alternating thin film layers of aluminum and nickel may be produced by turning off one of the aluminum sources and allowing the particles to recirculate around the track of vibrating trays (ref. FIG. 3B). A continuous single phase layer (i.e. aluminum or nickel layer) can be produced when the same gas compositions are used for all of the plasma sources, or when a single plasma source is used. A layer of alloy can also be formed between layers of metals. Such layers can provide reflecting. absorbing, magnetic, or other properties in optical thin-film structures. Many other types metal deposition chemistries are available and suitable for use in the system to produce any several of a variety of metal layers.

In some embodiments, a magnetic material is sandwiched between or surrounded by an aluminum layer, thus providing a reflective flake or preflake that looks the same as a standard aluminum flake. Such magnetic flakes may be used in anti-counterfeiting applications. In a particular embodiment, a glass flake is coated on both sides with nickel, and then with aluminum. In another embodiment, a glass flake is coated with aluminum, then a dielectric layer, and then an absorber layer of nickel.

In another embodiment, $SiCl_4$ is provided as the precursor to the first plasma source 196, $TiCl_4$ is provided as the precursor to the second plasma source 200, and $SiCl_4$ is provided as the precursor to the third plasma source 204. Oxygen, hydrogen, and argon ($O_2$, $H_2$, and Ar) are provided to each of the plasma sources as process gases. This combination can be used to form a variety of layers, such as $SiO_X$, $TiO_X$ (where X may be an integer or non-integer value), or combinations of materials and phases. For example, alternating layers of $TiO_X$ and $SiO_X$ may be deposited, or a continuous single phase layer (e.g. $SiO_X$ or $TiO_X$). Alternatively, a mixture of phases can be formed in a layer. It may be desirable to mix the phases in a layer to obtain an index of refraction between the index of each phase (e.g. between about 1.45 and 2.4 in this example). Such a mixture of phases can also be inserted between layers of single-phase material, such as a thin-film stack of $SiO_X$—$TiO_X$—$SiO_X$/$TiO_X$—$SiO_X$—$TiO_X$. Such layers can be used as dielectric or spacer layers in optical thin-film structures, and other types of oxides or spacer material, such as dielectric or semi-conductor material, can be formed. TEOS, HMDSO or other precursors may be used to form the layers, including mixed layers.

In another embodiment, $TiCl_4$ is provided to the first 196 and third 204 plasma sources, while $TiCl_4$ and $CH_4$ are provided to the second plasma source 200. Nitrogen, hydrogen and argon ($N_2$, $H_2$, and Ar) are provided to the first and third plasma sources as process gases, while $H_2$ and Ar are provided as process gases to the second plasma source. This combination can form layers of $TiN_X$ and $TiC_X$, either as alternating layers of each material, or as a layer of carbonitride ($TiC_XN_Y$) by itself or between layers of other materials. Such materials are useful as absorber layers in optical thin-film structures. Introducing various precursors simultaneously to the deposition system can provide a desired mixing of phases within a layer, rather than deposition of successive layers of different phases or graded phases.

Figure 6:
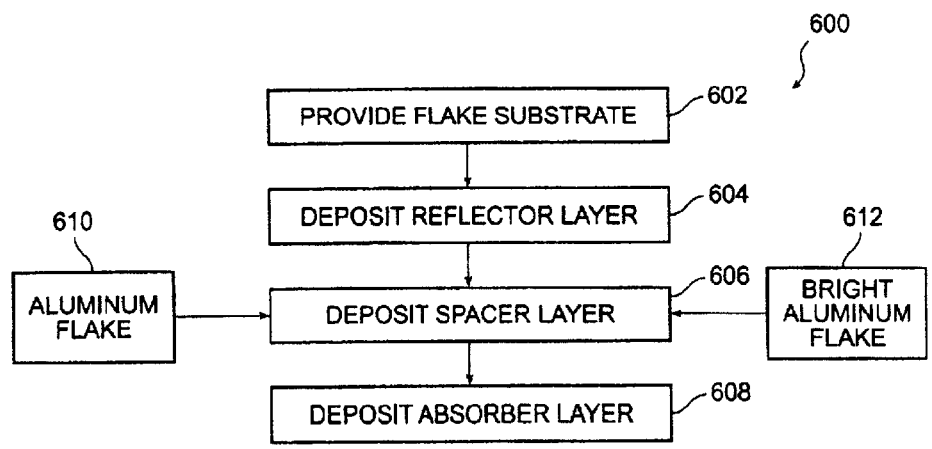
FIG. 6 is a simplified flow chart of a process according to an embodiment of the present invention.

FIG. 6 is a simplified flow chart of a method 600 for producing coated particles according to an embodiment of the present invention. A flake substrate is provided to a deposition system (step 602). The flake substrate could be a dielectric, semiconductor, or metallic (generally dark or low reflectivity) material, including glass, mica, alumina (aluminum oxide), iron oxide, boron nitride, bismuth oxychloride and various organic materials, such as plastic flakes. In some embodiments the flake substrates have specular (i.e. smooth, mirror-like) opposing major surfaces. A reflector layer is deposited on all surfaces of the flake substrate (step 604) to surround, or encapsulate, the flake substrate. The combination of a specular dielectric flake substrate and a highly reflective, such as an aluminum, reflector layer can produce a light, stiff, flat, highly reflective particle.

A dielectric or spacer layer is deposited over the reflector layer (step 606). This layer can be relatively thick, so it is desirable that the deposition rate be reasonably high (>100 Å/sec.). In some deposition systems according to embodiments of the present invention, the total deposition rate is the cumulative deposition rate from several plasma sources along the recirculating route that the particles travel in vibrating trays. The dielectric layer may be a series of layers of alternating materials, a series of layers of the same material, a single layer of material, including multiple phases within the layer. Similarly, multi-phase layers can be included in stacks of other layers of dielectric materials.

An absorber layer is deposited over the spacer layer(s) (step 608). The absorber layer can include a number of layers of various materials, or a single layer of material, or a layer of mixed-phase material. In another embodiment the flake substrate is clear and has an interference thickness. The reflector and spacer layers are omitted, and the absorber layer is deposited directly around the interference flake substrate.

In a particular embodiment, the same plasma sources are used to deposit the reflector, spacer, and dielectric layers of an OVP particle. The type of layer deposited depends on the process and precursor gases supplied to the plasma sources. For example, an aluminum precursor and suitable process gas is provided to the plasma source(s) to form the reflective layer, then the precursor and process gases are switched to form a dielectric layer, such as $SiO_2$, and then the precursor and process gases are switched again to form an absorber layer, such as TiN. This allows forming an entire optical stack without breaking vacuum on the chamber once the particles have been loaded. The substrate flakes and precursor gases to form such an Al—$SiO_2$—TiN optical stack are inexpensive, and form an attractive, durable, OVP particle.

In another embodiment, a Knudsen source is used to coat flat glass particles with an aluminum reflective layer. A dielectric layer of $SiO_2$, $TiO_2$, or ZnS is deposited using downstream PECVD or a Knudsen source. An absorber layer of TiN, C, Al, Ni, or Cr is deposited using downstream PECVD or arc magnetron sputtering. Batches of different OVP may be blended to achieve the desired color.

In an alternative embodiment, commercially available aluminum flakes are provided (step 610) to the step of depositing the spacer layer. In yet another embodiment, bright aluminum flakes are provided (step 612)

IV. Experimental Results

Depositing a reflective layer on a specular surface of a flake substrate in accordance with embodiments of the present invention have produced aluminum coated glass flakes with a reflectance of about 60% in one instance. It is anticipated that higher reflectance values can be obtained, particularly using silver alloy (stabilized silver) as the reflector layer, but also that higher reflectivity values might be obtained even using aluminum as the reflective layer.

Glass flakes with specular surfaces and having thicknesses between about 0.5 to 1.5 microns were pressed onto a tape and a layer of aluminum was deposited by evaporation to evaluate the results that might be obtained by embodiments of the present invention. A layer of $SiO_2$ of four QWOT's at 550 nm was deposited over the aluminum reflective layer. The glass flakes coated with aluminum had a reflectance of 75%, and the glass flakes coated with both the aluminum reflector layer and the 4 QWOT $SiO_2$ layer and an absorber layer of TiN showed excellent color shifting characteristics of green to blue.

A downstream microwave plasma source has demonstrated an $SiO_2$ deposition rate of about 1 micron/minute using hexamethyl disiloxane as a silicon precursor and oxygen as a plasma process gas. Deposition rates for metals or reacted metals (nitrides, carbides, oxides, or combinations) using high-density plasma sources on the order of 100 to 200 Angstroms/second have been demonstrated.

A deposition system essentially in accordance with FIGS. 2A was used to validate an optical design using downstream PECVD. The plasma source was an RF inductively coupled helical resonator. A 1-inch square substrate was pre-coated with 80 nm of aluminum and a 4 QWOT at 550 nm layer of $SiO_2$ in a standard box coater evaporator using electron beam evaporation. The process gases, Ar, $N_2$, $NH_3$, $CH_4$ and $H_2$ were introduced through the RF plasma zone. The precursor gas was $TiCl_4$, which was introduced in the vicinity of the substrate holder using a ring-shaped gas distributor. The chamber pressure was fixed at 100 mTorr.

The substrate temperature, gas flows, RF power, and deposition time were varied to obtain the best optical properties. Table 1 summarizes the process conditions, and Table 2 indicates the optical performance obtained for some of the samples. Those skilled in the art will appreciate that the values obtained depend in part on the measurement system being used, and that the relative values allow comparisons to be made between the various samples. The values in Table 2 were taken with a DATACOLOR SF 600+ microspectrophotometer equipped with an integrating sphere.

TABLE 1

Process Parameters for Deposition of
Ti Compounds using RF Excitation in a Down-Stream Configuration

| Sample | TiCl$_4$ (sccm) | Ar (sccm) | H$_2$ (sccm) | N$_2$ (sccm) | RF power (W) | Temp. (° C.) | Time (sec.) |
|---|---|---|---|---|---|---|---|
| TiN-RF1 | 5 | 25 | 90 | 35 | 100 | 300 | 60 |
| TiN-RF2 | 5 | 25 | 90 | 35 | 150 | 300 | 50 |
| TiN-RF3 | 5 | 25 | 90 | 35 | 400 | 25 | 60 |
| TiN-RF4 | 5 | 25 | 90 | 35 | 300 | 300 | 60 |
| TIN-RF5 | 5 | 25 | 90 | 35 | 300 | 200 | 60 |
| Tin-RF6 | 5 | 25 | 90 | 35 | 300 | 100 | 135 |
| — | — | — | — | CH$_4$ (sccm) | — | — | — |
| TiN-RF7 | 5 | 25 | 90 | 35 | 300 | 100 | 135 |
| TiN-RF8 | 5 | 25 | 25 | 10 | 300 | 100 | 120 |
| TIN-RF9 | 6 | 25 | 25 | 25 | 300 | 300 | 210 |
| — | — | — | N$_2$ (sccm) | — | — | — | — |
| TiN-RF10 | 6 | 25 | 35 | 25 | 300 | 200 | 195 |
| TIN-RF11 | 6 | 25 | 35 | 25 | 300 | 200 | 60 |
| TiN-RF12 | 6 | 25 | 35 | 25 | 300 | 100 | 75 |
| — | — | — | — | NH$_3$ (sccm) | — | — | — |
| TIN-RF13 | 6 | 25 | 0 | 80 | 300 | 100 | 125 |
| TiN-RF14 | 6 | 50 | 0 | 60 | 300 | 100 | 180 |
| TiN-RF15 | 6 | 25 | 0 | 100 | 300 | 100 | 240 |

TABLE 2

Color Characteristics of Selected Samples from Table 1

| Sample | L* | C* | h |
|---|---|---|---|
| Evap. Cr | 80.41 | 69.12 | 137.92 |
| TiN-RF2 | 78.68 | 82.98 | 143.63 |
| TiN-RF10 | 77.56 | 81.44 | 144.66 |
| TiN-RF10 | 79.79 | 78.22 | 133.26 |
| TiN-RF4 | 80.04 | 77.46 | 136.35 |
| TIN-RF6 | 83.68 | 68.6 | 131.28 |
| TiN-RF5 | 88.96 | 36.47 | 144.16 |

Table 2 includes a reference sample that had an absorber layer of evaporated chromium about 8 nm thick. L* is the lightness, and C* is the chroma, and h is the hue of the samples. From these results it is seen that a higher chroma than the chromium standard is obtained under some downstream plasma conditions for depositing a layer of TiN as the absorber layer in an optical interference stack.

To further prove that one could make optically variable pigment starting from glass flake, the following experiment was performed. Glass flake of the type known as RCF-160, available from NIPPON GLASS FLAKE COMPANY, was coated with aluminum by sputtering the aluminum in a box coater equipped with vibrating trays arranged in a square configuration. The glass flake vibrated around the trays as the aluminum was deposited on it. Following the Al coating, the glass flakes were ground to approximately 70 microns from the original 160-micron size. The ground flakes were then attached to sticky tape and 4 quarter-wavelength at 620 nm thickness of MgF$_2$ and 6.6 nm of Cr were deposited in another box coater to form green-to-blue color shifting pigment. Color measurements on these pigments while still attached to the tape were made on a DATACOLOR SF 600. The color properties for five different runs are shown below in Table 3, with a* being the red/green coordinate, with +a* indicating red, and −a* indicating green, and b* being the yellow/blue coordinate, with +b* indicating yellow, and −b* indicating blue, in accordance with CIE L*a*b* color data ("colorimetric") conventions.

TABLE 3

Color Characteristics of Samples with Sputtered Aluminum Reflector

| Sample | L* | a* | b* | C* | h |
|---|---|---|---|---|---|
| Run 1 | 59.38 | −14.24 | 13.96 | 19.94 | 135.55 |
| Run 2 | 65.52 | −13.84 | 16.17 | 21.29 | 130.56 |
| Run 3 | 61.74 | −15.43 | 14.02 | 20.84 | 137.74 |
| Run 4 | 63.96 | −19.19 | 14.34 | 23.96 | 143.23 |
| Run 5 | 65.05 | −17.56 | 18.90 | 25.80 | 132.89 |

Figure 7:
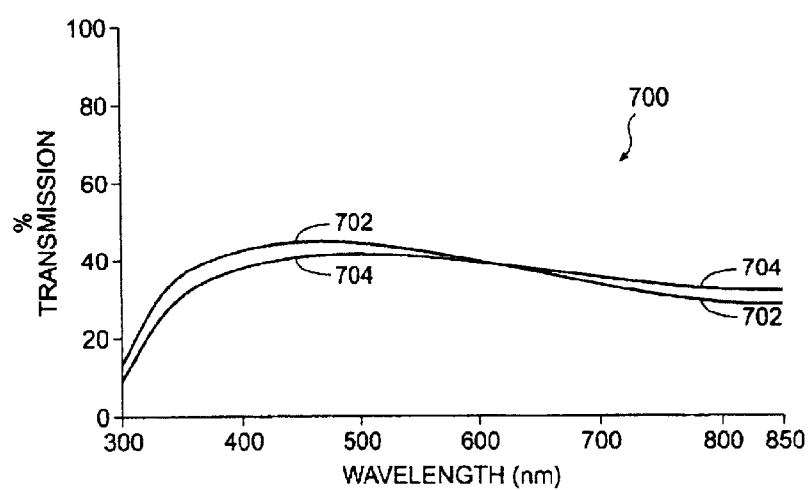
FIG. 7 is a simplified graph of transmission versus wavelength for a test coating of an absorber layer illustrating film stability.

FIG. 7 is a graph 700 of the transmittance of the TiN film corresponding to sample TiN-RF2 co-deposited on a bare glass slide, before (702) and after (704) soaking in water at 60° C. for 24 hours. This result shows good stability of the TiN film deposited with downstream PECVD in the presence of high humidity.

While the invention has been described above in terms of various specific embodiments, the invention may be embodied in other specific forms without departing from the spirit of the invention. Thus, the embodiments described above illustrate the invention, but are not restrictive of the invention, which is indicated by the following claims. All modifications and equivalents that come within the meaning and range of the claims are included within their scope.

What is claimed is:

1. An optically variable pigment particle comprising:
   a substrate particle;
   a reflector layer disposed on and encapsulating the substrate particle;
   a spacer layer disposed on and encapsulating the reflector layer; and
   an absorber layer disposed on and encapsulating the spacer layer.

2. The optically variable pigment particle of claim 1 further comprising a fluorescent layer.

3. The optically variable pigment particle of claim 1 further comprising a magnetic layer.

4. The optically variable pigment particle of claim 1 wherein the substrate particle comprises dielectric material.

5. The optically variable pigment particle of claim 1 wherein the reflector layer, the spacer layer, and the absorber layer all comprise aluminum.

6. The optically variable pigment particle of claim 1 wherein the reflector layer is an aluminum layer, the spacer layer is an aluminum oxide layer, and the absorber layer is a partially transmitting aluminum layer.

7. The optically variable pigment particle of claim 1 wherein the reflector layer, the spacer layer, and the absorber layer all comprise titanium.

8. The optically variable pigment particle of claim 1 wherein the reflector layer is metallic titanium, the spacer layer is titanium dioxide, and the absorber layer is titanium nitride.

9. An optically variable pigment particle comprising:
   a glass flake;
   an aluminum reflector layer disposed on the glass flake;
   a silicon-containing spacer layer disposed on the reflector layer; and
   a titanium-containing absorber layer disposed on the silicon-containing spacer layer.

10. The optically variable pigment particle of claim 1 wherein the substrate particle is a flake having
    a first specular surface, a second specular surface, and an aspect ratio of at least 2:1.

11. The optically variable pigment particle of claim 10 wherein the flake has an aspect ratio of at least 10:1.

12. The optically variable pigment particle of claim 10 wherein the flake has an aspect ratio of at least 20:1.

13. The optically variable pigment particle of claim 10 wherein the flake comprises an inorganic dielectric material.

14. The optically variable pigment particle of claim 10 wherein the flake comprises polymer.

15. The optically variable pigment particle of claim 1 wherein the substrate particle comprises metal.

16. The optically variable pigment particle of claim 1 wherein the substrate particle is a dielectric flake comprising a flake material selected from the group of mica, alumina, iron oxide, bismuth oxychloride, glass, boron nitride, and polymer.

17. The optically variable pigment particle of claim 1 wherein the substrate particle is a magnetic particle.

18. A particle comprising:

a dielectric flake having
 a specular surface, and
 an aspect ratio of at least 4:1;

a reflector layer disposed on at least one surface and on at least one side of the dielectric flake; and a dielectric layer disposed on and encapsulating the reflector layer.

19. The particle of claim 18 wherein the dielectric flake is a glass flake having a thickness between 0.2–2.0 microns.

20. The particle of claim 18 further comprising a second specular surface.

21. The particle of claim 18 wherein the reflector layer encapsulates the dielectric flake.

22. The particle of claim 18 further comprising a second specular surface wherein the reflector layer encapsulates the dielectric flake.

23. The particle of claim 22 further comprising:

a spacer layer disposed on and encapsulating the reflector layer; and an absorber layer disposed on and encapsulating the spacer layer.

24. A particle comprising:

a glass flake having an interference thickness; and an absorber layer disposed on the glass flake.

25. The particle of claim 24 wherein the interference thickness is between 0.07 microns and 1.2 microns.

26. The particle of claim 24 wherein the interference thickness is between 0.2 microns and 0.7 microns.

27. The particle of claim 24 wherein the absorber layer encapsulates the glass flake.

28. A pigment particle comprising:

a first absorber layer disposed on a first major surface of a glass flake having an interference thickness; and a second absorber layer disposed on a second major surface of the glass flake.

29. The pigment particle of claim 28 wherein the interference thickness is between 0.07 microns and 1.2 microns.

30. The pigment particle of claim 28 wherein the pigment particle has a total thickness of less than 800 nm.

31. A particle comprising:

a glass flake having a thickness between 0.07 microns and 1.2 microns; and an absorber layer surrounding the glass flake to result in the particle having a thickness less than 800 nm.

32. A reflective flake comprising:

a flake substrate having a specular surface; and an aluminum layer surrounding the flake substrate.

33. The reflective flake of claim 32 wherein the reflective flake has a reflectivity of at least 60%.

34. The reflective flake of claim 32 wherein the flake substrate is a glass flake having a width between 5 and 200 microns.

35. A reflective flake comprising:

a glass flake having
 a first specular surface and
 a second specular surface; and a reflective layer surrounding the glass flake to provide a reflectivity of at least 60%.

36. An optically variable pigment particle consisting of:

a substrate particle, a reflector layer disposed on and encapsulating the substrate particle;

a spacer layer disposed on and encapsulating the reflector layer; and an absorber layer disposed on and encapsulating the spacer layer.

37. A reflective flake consisting of:

a flake substrate having first and second specular surfaces and a width between 5 and 200 microns; and an aluminum reflector layer encapsulating the flake substrate.

* * * * *